(12) United States Patent
Shay

(10) Patent No.: US 7,058,098 B1
(45) Date of Patent: Jun. 6, 2006

(54) SELF-SYNCHRONOUS LOCKING OF OPTICAL COHERENCE BY SINGLE-DETECTOR ELECTRONIC-FREQUENCY TAGGING

(75) Inventor: Thomas M. Shay, Albuquerque, NM (US)

(73) Assignee: The United States of America as represented by the Secretary of the Air Force, Washington, DE (US)

( * ) Notice: Subject to any disclaimer, the term of this patent is extended or adjusted under 35 U.S.C. 154(b) by 0 days.

(21) Appl. No.: 11/289,260

(22) Filed: Nov. 29, 2005

(51) Int. Cl.
*H01S 3/10* (2006.01)
*H01S 3/13* (2006.01)

(52) U.S. Cl. .............. 372/29.016; 372/26; 372/29.01; 372/29.011; 372/29.023

(58) Field of Classification Search ........... 372/29.016, 372/29.01, 29.011, 29.021, 29.023

See application file for complete search history.

(56) References Cited

OTHER PUBLICATIONS

R. R. Rice et, J. A. Davis, J. S. Whitely, J. H. Hollister, and N. F. Ruggieri, "Coherent Fiber MOPA," 14th Annual Solid State and Diode Laser Technology Review, Albuquerque, NM, May, 2001.
J. Abderegg, S. J. Brosnan, M. E. Weber, H. Komine, and M. G. Wickham, "8-Watt Coherently-Phased 4-Element Fiber Array," Proceedings of the SPIE vol. 4974, pp. 1-6, 2003.
S.J. Augst, T. Y.Fan, and Antonio Sanchez, "Coherent Beam Combining and Phase Noise Measurements of Yb fiber Amplifiers," Optics Letters, vol. 29, No. 5, pp. 474-476, Mar. 1, 2004.

*Primary Examiner*—Armando Rodriguez
(74) *Attorney, Agent, or Firm*—Kenneth E. Callahan

(57) ABSTRACT

A coherent laser beam combining system wherein the output of a single master oscillator is split into a plurality of N signals, and the N signals are electronically modulated at unique frequencies. There is no reference signal and all of the signals are passed through phase adjusters. All N signals are optically amplified, aligned and passed through a beam splitter to split off a small sample that is imaged onto a photodetector. The photodetector output is fed to a signal processor that separates the N signals and produces N phase error signals that drive the N phase adjusters resulting in a high-powered optically coherent output signal.

4 Claims, 2 Drawing Sheets

SELF-SYNCHRONOUS LOCKING OF OPTICAL COHERENCE BY SINGLE-DETECTOR ELECTRONIC-FREQUENCY TAGGING

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to multiple element optical amplifier arrays used to achieve a high power beam and in particular, to a coherent beam combining system to facilitate such laser amplifier arrays.

The intensity and, hence, the power available from a single-mode optical fiber is limited by either optical surface damage or nonlinear optical effects. These limitations can be overcome by coherent beam-combining of the output power from multiple optical fibers. Fine control of the optical phase is required for any multi-fiber approach. In a master oscillator power amplifier (MOPA) configuration, the optical paths of each of the fibers have to be controlled to a fraction of the wavelength in order to coherently combine the individual outputs into a single, high-power beam. As a result of time varying thermal loads and other disturbances, an active feedback system is required to provide for both coherent addition and rapid slewing of the final beam direction There have been a number of experimental and theoretical research efforts directed toward developing a practical scheme for coherent beam combining. A number of researchers have implemented electronic phase locking that has demonstrated high fringe visibility for both passive (R. R. Rice et, J. A. Davis, J. S. Whitely, J. H. Hollister, and N. F. Ruggieri, "Coherent Fiber MOPA," $14^{th}$ Annual Solid State and Diode Laser Technology Review, Albuquerque, N. Mex., May, 2001 and J. Abderegg, S. J. Brosnan, M. E. Weber, H. Komine, and M. G. Wickham, "8-Watt Coherently-Phased 4-Element Fiber Array," Proceedings of the SPIE vol. 4974, pp. 1–6, 2003) and active systems (S. J. Augst, T. Y. Fan, and Antonio Sanchez, "Coherent Beam Combining and Phase Noise Measurements of Yb fiber Amplifiers," Optics Letters, Vol. 29, No. 5, pp. 474–476, Mar. 1, 2004). In previously described electronic phase locked fiber arrays, each leg of the array is modulated at the same RF frequency or alternatively the reference beam is the only beam modulated at an RF frequency. The light emerging from each leg is then interfered with the light from a reference leg. Because the same RF frequency is used to modulate each array leg, the light from each leg must be sent to spatially separate photodetectors. Good fringe visibilities of greater than 94 percent, and hence, very low phase errors were measured. However, Abderegg et. al. reported that the spatial alignment had stringent requirements even when the fiber-to-fiber spacing was 3-mm. For practical purposes, any array locking method must confine most of the array power into a single lobe. This in turn requires the use of a closely packed array. The closer the array elements are in a system using multiple photodetectors, the more stringent the spatial alignment tolerances required to ensure that there is no interference from adjacent array elements.

All of the above systems required one photodetector per array element leading to a more complex system and requiring great care be taken to ensure that the light from adjacent array elements is eliminated from the photodetector. To achieve the required spatial isolation a heavy optical platform is needed. The external reference beam also adds to the optical complexity and increases the size and weight of the optical platform. Clearly it would be advantageous to have a coherent beam combining system that used a single photodetector and needed no external reference beam.

A system for electronic phase locking of optical arrays that eliminates the external reference beam and in addition uses only a single photodetector is the subject of a pending patent application and is hereby incorporated by reference (T. M. Shay, "Self-referenced Locking of Optical Coherence by Single-detector Electronic-frequency Tagging," application Ser. No. 11/215,055). Self-referenced Locking of Optical Coherence by Single-detector Electronic-frequency Tagging eliminated drawbacks of the previous electronic phase locking systems while preserving high locking fidelity and scalability of electronic phase locking systems. It would be advantageous if the reference beam itself could be eliminated.

SUMMARY OF THE INVENTION

The present invention is a unique coherent beam combining system for a laser amplifier array. In a preferred embodiment, the output power of the signal from a single master oscillator is split by a 1 by N splitter and directed simultaneously into an array of the N optical modulators where each of the N signals is modulated by a unique electronic frequency. The modulation frequencies must be selected so that beat notes between the N element optical signals can be uniquely isolated for each element. The N modulated signals are fed to N phase adjusters and then optically amplified. A small portion of each of the N amplified signals is split off and imaged onto a single photodetector. The photodetector output is fed to a signal processor that produces phase error signals that drive the N phase adjustors. The final output is a high-powered optically-coherent signal. No reference beam is necessary.

In this technique, called Self-Synchronous Locking of Optical Coherence by Single-detector Electronic-frequency Tagging (Self-Synchronous LOCSET), the phase errors between the array elements self adjust so that the average phase error is zero, thereby maximizing the power in the central lobe. In all the previous phase locking techniques the signal-to-noise ratio remains constant or decreases under shot noise limited conditions as array elements are added. In the Self-Synchronous LOCSET technique under shot noise limited conditions, the signal-to-noise ratio actually increases proportionally to the number of array elements, resulting in a system that becomes more stable as the number of array elements increase, contrary to what would ordinarily be expected for a single detector system. Furthermore, the method can easily be scaled to large numbers of array elements because the scaling is done in the electronic instead of the spatial domain. This technology is applicable to general systems of laser amplifiers, i.e., semiconductor, bulk solid state, gas, dye, as well as fiber amplifiers.

DESCRIPTION OF THE PREFERRED EMBODIMENT

A novel coherent beam combining system is described that offers not only highly accurate and robust phase locking but is readily scalable to hundreds of elements. Furthermore, this method, called Self-Synchronous LOCSET, provides a simple and robust method that needs only a single detector and has no reference leg. All previous phase locking techniques using a separate reference leg lose phase lock if the reference beam is lost or misaligned. In Self-Synchronous LOCSET there is no reference leg and the array performance degrades gracefully with the loss of any array element. In all of the previous phase locking methods the system fails completely if the reference beam is lost or misaligned. Self-Synchronous LOCSET is not susceptible to this single point failure mechanism.

Figure 1:
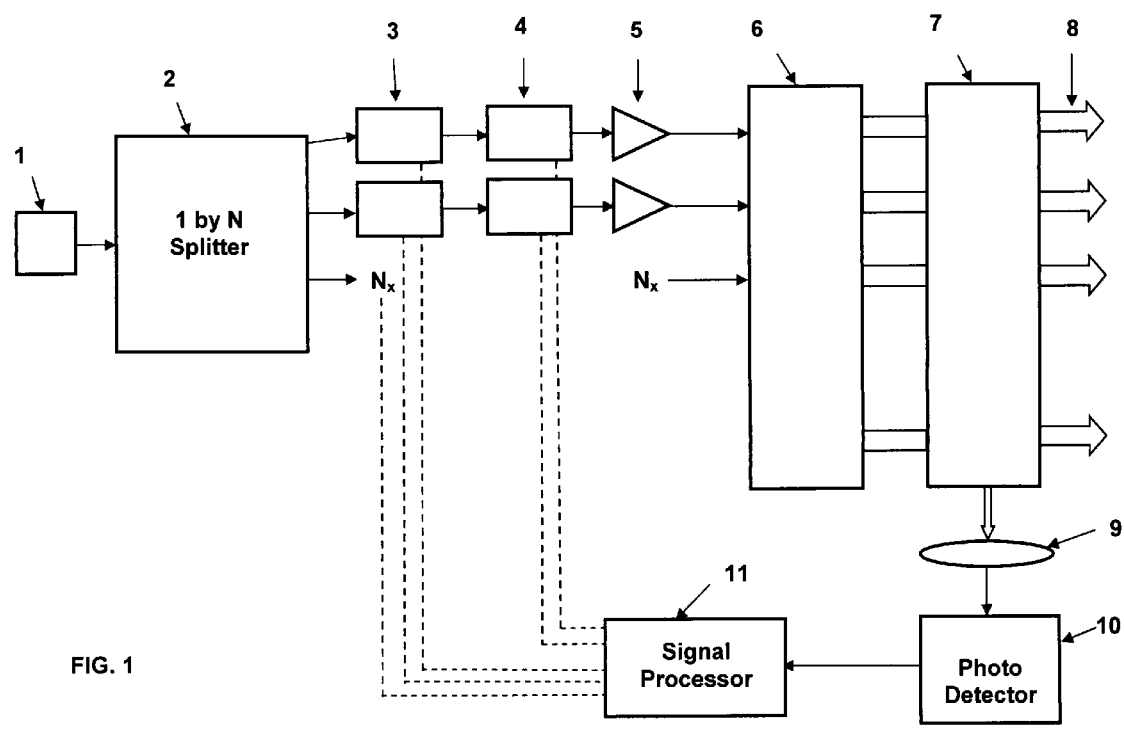
FIG. 1 is a block diagram of an embodiment of the present invention.

A block diagram of an embodiment of the present invention is shown in FIG. 1. The diagram begins with a master oscillator 1. There may or may not be an optical amplifier incorporated in the master oscillator laser. The output power from the master oscillator is divided by a 1×N power splitter 2. Each of the N output signals from the 1×N power splitter 2 is then directed to N optical modulators 3 where each of the N signals is modulated by a unique electronic frequency. All of the N elements are phase modulated. The modulation frequencies must be selected so that beat notes of the N elements can be uniquely isolated. The errors signals for each of the N elements are fed to N phase adjusters 4 and then to optical amplifiers 5. The optical modulators 3 and the optical phase adjusting elements 4 can be separate devices, or they may be single devices that perform both tasks. In principle the order of amplification does not matter. In practice power handling capabilities of some of the optical elements will determine if it is advantageous to perform modulation at lower powers. The outputs from the optical amplifiers 5 are then directed to the array output optics 6. The relative position of the optical amplifiers 5 and optical modulators 3 and phase adjusters 4 are in principle arbitrary. However, practical details such as power handling capability of individual elements, system noise characteristics, or even reduction of the modulation effectiveness by succeeding elements may lead to a preferred sequence of optical elements.

Next the N amplified outputs are optically co-aligned in the alignment optics 6 and, the output is directed to the beam sampler 7. In a variation of this embodiment, the beams may be sampled before the alignment optics. In that case the beam sampler 7 may precede the co-alignment optics 6. While the majority of the power passes through the beam splitter 7 and constitutes the array output 8, a small fraction of the array output is directed to the far field imaging optics 9 and then on to the photodetector 10. The imaging system 9 is used to image a far-field central spot onto the photodetector 10 that fills or overfills the active area of the photodetector 10. The signal-to-noise ratio for a given optical power in the sampled beam is optimized if only the central lobe of the far field is imaged onto the photodetector. However, this is not a necessary condition for achieving accurate phase control. Excellent phase locking can be achieved when the central lobe overfills or underfills the photodetector active area. It is only necessary that there be a sufficient signal-to-noise ratio for phase locking.

The electrical signals from the photodetector 10 are signal processed 11 to isolate and extract the phase control signals for each optical array element, and the phase control signals are then applied to the phase adjusting elements 4 using negative feedback to cancel the phase difference between the array elements. Optimum performance is obtained when the array elements are all traveling in the same direction with the same divergence. However, the optimum condition is not required for excellent phase control to be demonstrated.

The theoretical basis for the signal processing 11 will be presented first and then a preferred embodiment of the signal processing will be presented. Consider an optical array with N separate array legs. The characteristics of Self-Synchronous LOCSET are 1) the optical fields from the N array elements are all superimposed on a single photodetector; 2) each array element has a small RF phase modulation at a distinct RF frequency; 3) electronic signal processing is then applied to extract the amplitude of a beat note signal for each array leg that is proportional to the sine of the phase error between that individual array element and the other array elements; and 4) the amplitude of that signal is then processed and applied to correct the phase errors of the N individual array elements.

Description of the Signal Processing Embodiment

Figure 2:
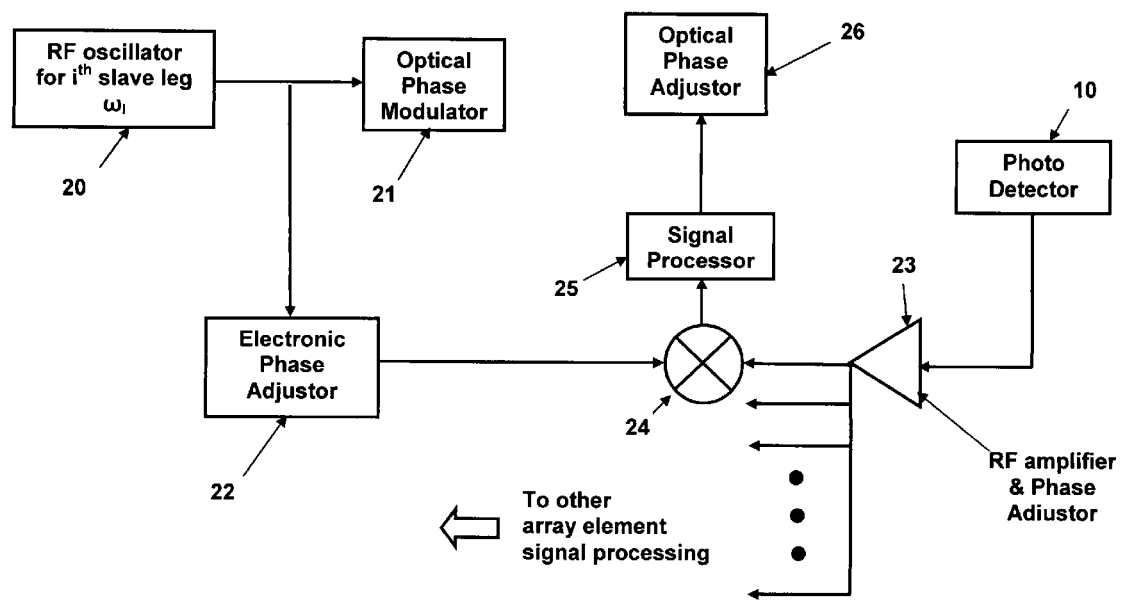
FIG. 2 is an electrical block diagram of the phase control loop for one of the block array elements illustrating a signal processing embodiment in which the array elements are phase modulated.

FIG. 2 illustrates the signal processing embodiment for the case where the array legs are all phase modulated. (This is the signal processor 11 in FIG. 1.) FIG. 2 is the electrical block diagram of the phase control loop for one of the N block array legs. Each array element has an RF oscillator 20 that operates at a frequency, $\omega_i$, which is unique to that array element. The RF oscillator 20 performs two functions. It drives the phase modulator 21 for that array leg to provide a small RF phase modulation, and it provides an RF signal that is used to extract the phase error term for that array leg from the photodetector 10 signal. An optional phase adjustor 22 is also shown in FIG. 2 that can compensate for phase shifts due to cable lengths. The photodetector 10 has the electrical signals from all of the interfering optical fields incident upon it. An optional electronic amplifier and power splitter 23 is shown in the FIG. 2.

The signal from the photodetector is sampled by all N of the signal processing legs, and the phase error signal for each array leg is extracted by the following signal processing steps. The signal from the RF oscillator 20 is mixed with the photocurrent signal in the RF mixer 24. The output of the RF mixer 24 is processed in the signal processor 25. The signal processing consists of 1) integrating the output of the RF mixer 24 to filter out the main error signals from the other array legs and extract the phase error signal amplitude that is proportional to $\sin(\phi_j - \phi_i)$; 2) amplifying and phase shifting this signal to provide the stable negative feedback conditions necessary for phase control operation; and 3) supplying electronics to reset the phase shifter modulo $2\pi$. The output of the signal processing electronics is applied to the optical phase adjuster 26 (4 of FIG. 1). Note that the phase adjuster 26 and the phase modulator 21 may be combined into a single element.

In this embodiment the phase error signal is, $$S_{rii} = R_{PD} \cdot \sqrt{P_i} \cdot J_1(\beta_i) \left( \sum_{\substack{j=1 \\ j \neq i}}^{N} \sqrt{P_j} \cdot J_0(\beta_j) \cdot \sin(\phi_j - \phi_i) \right) \quad \text{Eq. 1}$$

where $R_{PD}$ represents the responsivity of the photodetector, $P_i$ represents the power in the phase element that is being locked by this control loop, $P_j$ represents the power in the other array elements, N represents the number of elements in the array, $J_{1,0}$ represent the Bessel function of the first kind of order 1 and 0, respectively. $\beta_{i,j}$ represents the phase modulation amplitudes of the phase element that is being locked (i) and the other array elements (j), respectively. $\phi_i$ and $\phi_j$ represent the optical phases of the $i^{th}$ and $j^{th}$ array element element, respectively.

The invention claimed is:

1. A coherent laser beam combining system comprised of:
   a. a master oscillator having a laser output signal;
   b. a 1×N power splitter, whereby the output signal of the master oscillator is split into a plurality of N output signals;
   c. means for phase modulating each of the N output signals of said power splitter with a unique electronic frequency, whereby the modulation frequencies are selected such that a phase error signal for each of the N phase modulated output signals can be uniquely isolated;
   d. N optical phase adjusting elements for receiving said N phase modulated signals and outputting N phase modulated signals;
   e. means for amplifying said N modulated output signals;
   f. means for optically co-aligning said N amplified signals;
   g. means for sampling said N optically aligned signals;
   h. an imaging system for directing said N sampled signals onto a photodetector;
   i. means for signal processing the output of said photodetector, thereby to isolate and extract phase control signals for each of the N output signals and to apply said phase control signals to said N optical phase adjusting elements using negative feedback to cancel the phase difference between the N array element signals, thereby resulting in a high-powered optically-coherent laser beam output.

2. The coherent laser beam combining system of claim 1, wherein the means for phase modulating each of the N output signals of said power splitter with a unique frequency is an RF oscillator that drives an optical phase modulator.

3. The coherent laser beam combining system of claim 2, wherein the means for signal processing is comprised of:
   a. a mixer combining said N sampled signals output by said photodetector with the unique frequencies is said RF oscillator to thereby extract the N output signals.
   b. a signal processor to isolate and extract unique phase error signal amplitudes that are proportional to $\sin(\phi_j - \phi_i)$ for each of the N output signals, whereby these signals are amplified and phase shifted to provide stable negative feedback to said N optical phase adjusters.

4. A method of implementing a coherent laser beam combining system, the method comprising:
   a. splitting the output signal of a master oscillator into N signals;
   b. phase modulating each of said N signals at a unique frequency, wherein the modulation frequencies are selected such that a phase error signal for each of the N output siginals can be uniquely isolated;
   c. feeding said N output signals to N optical phase adjusters;
   d. optically amplifying the output of said N phase adjusters;
   e. feeding said N amplified signals to alignment optics;
   f. feeding the N output signals of said alignment optics to a beam sampler, wherein a small portion of the alignment optics output signals is split off and imaged onto a photodetector and the remainder of the alignment optics output signals are passed through the beam sampler and become the final output;
   h. directing an output signal of said photodetector to a signal processor to isolate and extract N unique phase error signal amplitudes that are proportional to $\sin(\phi_j - \phi_i)$ for each of the N sampled signals;
   i. directing said N phase error signals to said N optical phase adjusters to provide stable negative feedback to said N optical phase adjusters, thereby resulting in a high-powered optically-coherent laser beam output.

* * * * *